(12) United States Patent
Keskitalo et al.

(10) Patent No.: US 10,070,277 B2
(45) Date of Patent: Sep. 4, 2018

(54) METHOD AND APPARATUS FOR PROVIDING A DYNAMIC POLLING NOTIFICATION SYSTEM

(71) Applicant: Nokia Corporation, Espoo (FI)

(72) Inventors: Tuomas Veli Keskitalo, Oulunsalo (FI); Tommi Heinonen, Tampere (FI); Markus Isomaki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 109 days.

(21) Appl. No.: 14/145,071

(22) Filed: Dec. 31, 2013

(65) Prior Publication Data

US 2015/0188799 A1  Jul. 2, 2015

(51) Int. Cl.
*H04W 4/12* (2009.01)
*H04L 29/08* (2006.01)

(52) U.S. Cl.
CPC .............. *H04W 4/12* (2013.01); *H04L 67/26* (2013.01); *H04L 67/325* (2013.01)

(58) Field of Classification Search
CPC .................................................. H04L 43/103
USPC ........................................................ 709/203
See application file for complete search history.

(56) References Cited

U.S. PATENT DOCUMENTS

| 6,353,926 B1 | 3/2002 | Parthesarathy et al. |
| 2004/0171378 A1 | 9/2004 | Rautila |
| 2012/0131095 A1* | 5/2012 | Luna .................. H04L 67/04 709/203 |
| 2013/0013676 A1* | 1/2013 | Blair ................... G06Q 20/02 709/203 |
| 2013/0212562 A1 | 8/2013 | Fox et al. |

FOREIGN PATENT DOCUMENTS

| EP | 1 528 834 A2 | 5/2005 |
| EP | 2 175 614 A1 | 4/2010 |
| WO | 2008106761 A1 | 9/2008 |
| WO | 2012149078 A2 | 11/2012 |

(Continued)

OTHER PUBLICATIONS

Sungard Higher Education, "Banner Advancement, Data Load/Extract Handbook", Dec. 2011, Release 8.5, 232 pages.

(Continued)

*Primary Examiner* — Vivek Srivastava
*Assistant Examiner* — Sibte Bukhari
(74) *Attorney, Agent, or Firm* — Ditthavong & Steiner, P.C.

(57) ABSTRACT

An approach is provided for managing polling interval and activity time for communicating notifications from a server to a device. A notification server may cause a configuration of at least one polling interval and at least one activity time for communicating one or more notifications from at least one notification server to at least one device. Further, the notification server may cause a transmission of the at least one polling interval and the at least one activity time to the at least one device, wherein the polling interval specifies at least one offline time for the at least one device with respect to the at least one notification server, and wherein the activity time specifies at least one online time for the at least one device with respect to the at least one notification server.

14 Claims, 11 Drawing Sheets

(56) References Cited

FOREIGN PATENT DOCUMENTS

WO 2013033785 A1 3/2013

OTHER PUBLICATIONS

Mosesyan, "Fitness Point App.", iOS application, snapshot of www page as it appeared on Oct. 4, 2013, retrieved from https://www.facebook.com/FitnessPointApp/posts/308429565945597%252B, 1 page.
Lee, "Google TV Email About Update [New Version Has Begun Rolling Out!]", TechnoBuffalo, Oct. 31, 2011, retrieved from https://www.technobuffalo.com/2011/10/31/google-tv-emails-start-to-arrive-informing-users-for-update/, 7 pages.
Microsoft, "Microsoft Security Bulletin Advance Notification", Security Tech Center/Security Bulletins, retrieved from http://technet.microsoft.com/en-us/security/gg309152.aspx, Nov. 7, 2013, 2 pages.

\* cited by examiner

METHOD AND APPARATUS FOR PROVIDING A DYNAMIC POLLING NOTIFICATION SYSTEM

BACKGROUND

Service providers and device manufacturers (e.g., wireless, cellular, etc.) are continually challenged to deliver value and convenience to consumers by, for example, providing compelling network services. One area of interest has been developments in managing distribution of updates and related notifications to user devices, which may be utilizing various software/applications. For example, various content providers may wish to provide updates to their respective applications that may be in use at the user devices. In various settings, service/content providers may initiate (push) a delivery/transmission of the updates and/or notifications to a plurality of user devices. However, the delivery may be via different messaging mechanisms and at different times, which may be inefficient for the service/content provider and/or for the users of the user devices. For example, not all user devices may be or may be capable to be online and connected to a communication channel when the updates/notifications are transmitted to the user devices. As a result, service providers face significant challenges in managing an efficient delivery of the updates or notifications to the user devices.

SOME EXAMPLE EMBODIMENTS

Therefore, there is a need for an approach for managing polling interval and activity time for communicating notifications from a server to a device.

According to one embodiment, a method comprises causing, at least in part, a configuration of at least one polling interval and at least one activity time for communicating one or more notifications from at least one notification server to at least one device. The method also comprises causing, at least in part, a transmission of the at least one polling interval and the at least one activity time to the at least one device, wherein the polling interval specifies at least one offline time for the at least one device with respect to the at least one notification server, and wherein the activity time specifies at least one online time for the at least one device with respect to the at least one notification server.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a configuration of at least one polling interval and at least one activity time for communicating one or more notifications from at least one notification server to at least one device. The apparatus is also caused to cause, at least in part, a transmission of the at least one polling interval and the at least one activity time to the at least one device, wherein the polling interval specifies at least one offline time for the at least one device with respect to the at least one notification server, and wherein the activity time specifies at least one online time for the at least one device with respect to the at least one notification server.

According to another embodiment, a computer-readable storage medium carries one or more sequences of one or more instructions which, when executed by one or more processors, cause, at least in part, an apparatus to cause, at least in part, a configuration of at least one polling interval and at least one activity time for communicating one or more notifications from at least one notification server to at least one device. The apparatus is also caused to cause, at least in part, a transmission of the at least one polling interval and the at least one activity time to the at least one device, wherein the polling interval specifies at least one offline time for the at least one device with respect to the at least one notification server, and wherein the activity time specifies at least one online time for the at least one device with respect to the at least one notification server.

According to another embodiment, an apparatus comprises means for causing, at least in part, a configuration of at least one polling interval and at least one activity time for communicating one or more notifications from at least one notification server to at least one device. The apparatus also comprises means for causing, at least in part, a transmission of the at least one polling interval and the at least one activity time to the at least one device, wherein the polling interval specifies at least one offline time for the at least one device with respect to the at least one notification server, and wherein the activity time specifies at least one online time for the at least one device with respect to the at least one notification server.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for managing polling interval and activity time for communicating notifications from a server to a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

It is noted that notifications, messages, and updates may be used interchangeably to indicate information about an update or a notification, which may be communicated from a server to one or more client devices. Also, a notification may be relevant to one or more applications, software, content items, or the like at the client device, wherein application, software, and content item may be used interchangeable to indicate a target of a notification.

Figure 1:
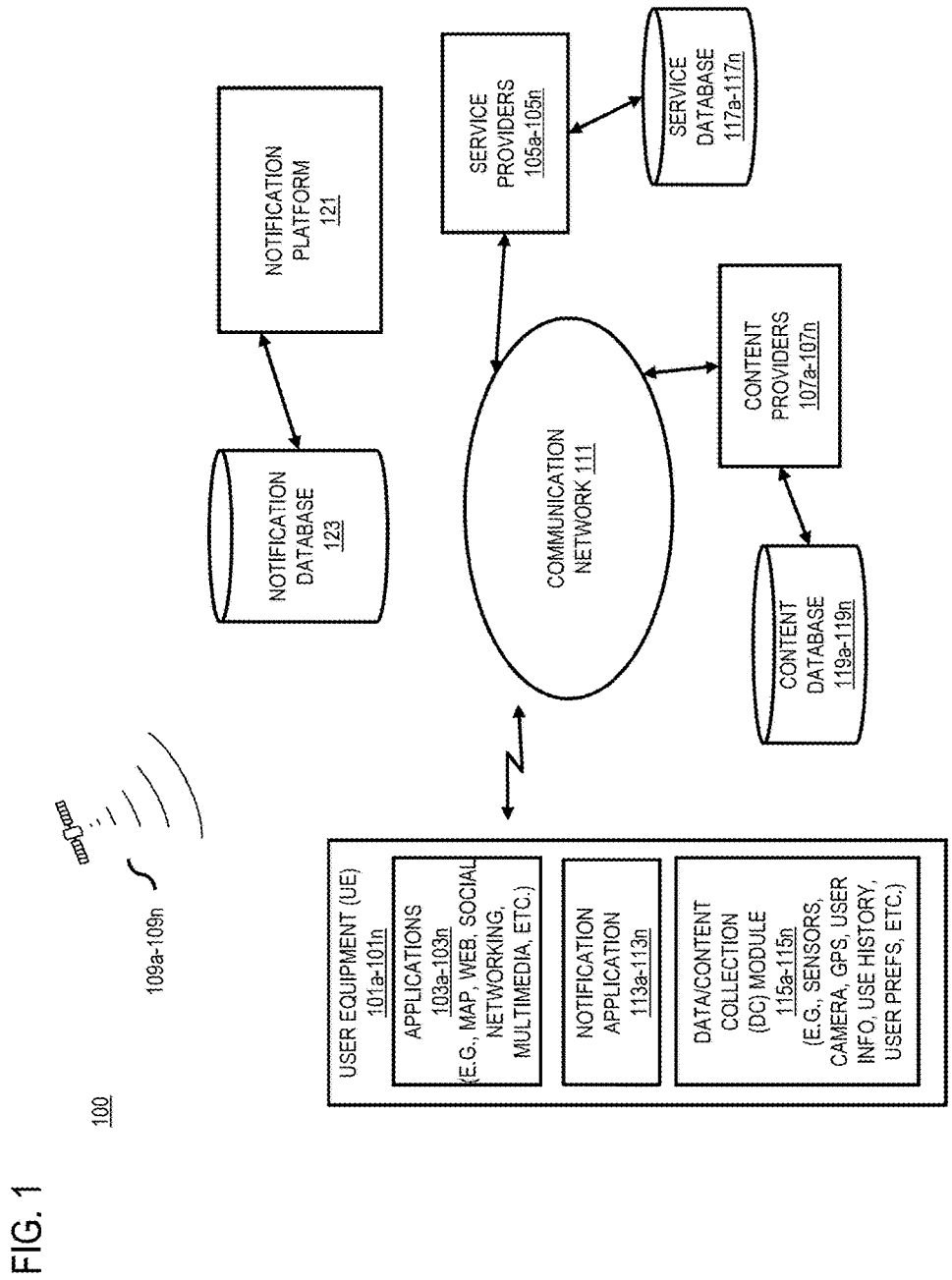
FIG. 1 is a diagram of a system capable of managing polling interval and activity time for communicating notifications from a server to a device, according to an embodiment.

FIG. 1 is a diagram of a system capable of managing polling interval and activity time for communicating notifications from a server to a device, according to an embodiment. With the prevalence of electronic devices (e.g., mobile phones, laptops, tablets, etc.), users may utilize a variety of these devices and applications for, e.g., online shopping, social networking services (e.g., blogging), content sharing, media upload, media download, media streaming, various account management, or the like. In many cases, software and applications on a device may be individually configured to request and/or receive timely notifications and updates, for instance, via one or more service or content providers. Sometimes the notifications are sent via short message service (SMS) or email messages, which may be inefficient as they may be costly for the service providers (e.g., use of communication bandwidth and resources) and for the users (e.g., use of data services via a communication network), or that the users may not always see the messages in a timely manner. Further, it may be more efficient for service providers to control proper delivery of the notifications by scheduling the transmission of the messages for when the user devices (recipients) may actually be on-line since the user devices sometimes may be off-line. For example, some users may choose to save on the cost of data services by configuring and limiting the times when their devices may be online for receiving update information.

To address, at least, this problem, a system 100 of FIG. 1 introduces the capability to manage polling intervals and activity times for communicating notifications and updates from a server to one or more devices. In one embodiment, a user device (e.g., a push notification client (PNC)) in the system 100 may register one or more applications at the device with a push notification server (PNS) wherein the PNS, according to a predefined schedule (e.g., daily, weekly, etc.), may forward to the PNC one or more notifications, messages, updates, etc. associated with the applications. In one embodiment, the PNS may determine one or more schedules and communicate the schedules to one or more PNCs.

In one embodiment, a PNS may receive a request from a PNC for one or more updates, wherein the PNS may determine/generate and return to the PNC one or more parameters associated with one or more schedules for communications between the PNC and PNS where the PNC is to be online (e.g., via a communication channel.) For example, the PNS may transmit/deliver to a PNC one or more notifications, one or more updates, one or more parameters, or the like, which may indicate a polling interval and activity time (e.g., in three days) for the PNC to be online and communicate with the PNS.

In various embodiments, methods of the system 100 may be advantageous to a service provider, PNS, to better manage the communications of notifications to a plurality of devices, wherein transmissions of the notifications may be scheduled, combined, and reduced in number and thereby more efficient for network performance (e.g., more capacity can be used for other purposes.) Furthermore, the user devices, PNCs, that seldom may be online or those that do not actively utilize certain applications, could utilize a schedule from a PNS for being online and receiving any potential notification, messages, or updates available from the PNS.

In one embodiment, the system 100 may cause, at least in part, a configuration of at least one polling interval and at least one activity time for communicating one or more notifications from at least one notification server to at least one device. In one embodiment, the activity time specifies at least one online time for the at least one device with respect to the at least one notification server. For example, the online time may indicate for PNC (e.g., a UE 101) to be online and ready to communicate with a PNS (e.g., a service provider) for receiving one or more notifications, updates, messages, polling interval, activity time, or the like. In one embodiment, the polling interval specifies at least one offline time for the at least one device (PNC) with respect to the at least one notification server (PNS). In one embodiment, a PNS may determine a polling interval and/or an activity time based on one or more information items associated with the user, the PNC, or a combination thereof. For example, a user profile information at a PNC may indicate that the user wishes to only receive notifications or updates during a certain time of day (e.g., during the morning.) In one example, a device configuration at a PNC may indicate that the activity time for communicating with the PNS should be when the device is in an idle mode, the batteries fully charged, the device is connected to a power source, or the like. In various embodiments, the least one polling interval, the at least one activity time, or a combination thereof are specified according to at least one absolute time, at least one relative time, or a combination thereof. In one embodiment, a PNS may utilize configuration or user profile information at a PNC to determine a relative or an absolute time for the polling interval and/or the activity time.

In one embodiment, the system 100 may cause, at least in part, a transmission of the at least one polling interval and the at least one activity time to the at least one device. In one embodiment, a PNS may transmit a similar or same polling interval or activity time to one or more PNCs, which may have a similar or same user profile or device configuration information. For example, a plurality of PNCs may be configured with a polling interval for when the PNCs at a certain location (e.g., at work, at home, at school, etc.) during the day.

In one embodiment, the system 100 may cause, at least in part, an initiation of the transmission of the at least one polling interval and the at least one activity time to the at least one device for an upcoming notification period when the at least one device communicates with the at least one notification server during a current communication period. In one scenario, a communication between a PNC and a PNS may include information about a next polling interval and activity time, wherein the activity time may include transmission of one or more notifications or updates to the PNC. In one scenario, a communication period may include only a next polling interval and no notifications of updates for that PNC.

In one embodiment, the system 100 may cause, at least in part, a generation of one or more activity rules for specifying the at least one polling interval and the at least one activity time. In one embodiment, a PNS may utilize various user or device information (criteria) of a PNC for determining and generating one or more activity rules or parameters, which may be used to generate or calculate a polling interval or an activity time. In various embodiments, the activity rules may be generated dynamically based on the user, PNC, or PNS information at a given time. For example, user profile may indicate that one or more applications at a PNC should be updated more frequently than other applications at the PNC.

In one example, the PNS information may indicate traffic volume at the PNS (e.g., how busy) may be.

In one embodiment, the system 100 may cause, at least in part, a transmission of the one or more activity rules to the at least one device. In one embodiment, the one or more activity rules may be communicated to a PNC so that it can utilize the activity rules for determining a polling interval or an activity time. In one embodiment, the activity rules may be utilized by either a PNS or a PNC for determining the polling interval or the activity time. In one scenario, the same one or more activity rules may be transmitted to a plurality of PNCs.

In one embodiment, the system 100 may cause, at least in part, a specification of one or more criteria for activating the at least one polling interval, the at least one activity time, the one or more activity rules, or a combination thereof. In one embodiment, the one or more criteria include, at least in part, data type criteria, location criteria, network type criteria (e.g., Wi-Fi, cellular, free of charge, etc.), application type criteria, activity criteria (walking, running, driving, etc.), device capability criteria, device resource availability criteria (e.g., battery life, radio signal level), device sensor information criteria (e.g., weather, barometer, etc.), recurrence criteria (e.g., calendar information), or a combination thereof. In various scenarios, the PNS may include a validity duration, exact time or date, location of the PNC, or the like so that the one or more activity rules may be utilized by a PNC. In one example, if two PNCs (e.g., two users) of same group are in close proximity/same location. In one scenario, based on an activity determined from one or more sensors on the PNC device, for example, many users may be at a sports stadium and the PNS server can utilize the polling interval and the activity-time based on received information about the location and activity. In scenario, capability information of a PNC may be shared with the PNS, wherein the PNS and/or the PNC may further adjust the polling interval and activity time. For example, the PNS may decrease or increase the polling interval and/or decrease the activity time based on communication network's traffic load.

In one embodiment, the system 100 may cause, at least in part, a transmission of the one or more criteria to the at least one device. In one scenario, a PNS may determine the one or more criteria and then communicate them to one or more PNCs.

In one embodiment, the system 100 may cause, at least in part, a synchronization of the at least one polling interval, the at least one activity time, or a combination thereof between the at least one device and one or more other devices receiving the one or more notifications. In one use case scenario, a PNS may provide one or more notifications and updates to a plurality of PNCs at the same time by synchronizing polling intervals and activity times of the plurality of PNCs. For example, many UEs 101 may be utilizing the same application which may need to be updated, wherein the service provider may be able to synchronize the updates to the UEs 101 by synchronizing the polling intervals and the activity times of those UEs 101.

In one embodiment, the system 100 may receive at least one request to initiate the at least one offline time, the at least one online time, or a combination thereof at one or more times other than indicated by the at least one polling interval, the at least one activity time, or a combination thereof. In one embodiment, a PNS may receive a request from a PNC to initiate an offline time or an online time, which may be different than those indicated in the polling interval and/or the activity time. For example, the request may come from a UE 101 that may be requesting for an update or a notification associated with one or more applications, software, content items, or the like at the UE 101. In one scenario, the request from a PNC may be due to unexpected changes at the PNC, for example, the PNC may be anticipating being a different location (e.g., according to a calendar entry) during an already scheduled activity time so the user of the PNC or an application at the PNC may initiate the request.

In one embodiment, the system 100 may cause, at least in part, a transmission of at least one command to initiate the at least one offline time, the at least one online time, or a combination thereof to the at least one device in response to the at least one request. In one scenario, a PNS may transmit to a PNC one or more criteria, commands, or times for generating or initiating the requested offline or online times. In one scenario, the PNS may determine and transmit the offline and online times to the PNC.

In one embodiment, the system 100 may determine one or more activities being performed at the at least one device. In one scenario, a PNS may inquire information from one or more applications at a PNC for determining if there are any current activities at the PNC. For example, to determine if the user or any application/module at the PNC are actively utilizing any resources at the PNC, e.g., is the user consuming a media content item, or is accessing the Internet, or is reading email messages, or an application is performing a backup of the PNC content to a network location. In one embodiment, the PNS may inquire about to one or more activities in the near future. For example, an application at the PNC may indicate that the user has requested for downloading of a media content item, which will begin in five minutes.

In one embodiment, the system 100 may cause, at least in part, an updating of the at least one polling interval, the at least one activity time, or a combination thereof based, at least in part, on the one or more activities. In one embodiment, a PNS may utilize information related to one or more activities at the PNC and determine an update of the polling interval or the activity time associated with the PNC. For example, the PNS may determine that the user is utilizing application which is to be updated and then the PNS may update a polling interval and activity time for when the user has completed utilizing the application. In one embodiment, the PNS may request for the PNC to send an update on the activity at the PNC.

In one embodiment, the system 100 may cause, at least in part, a presentation of at least one prompt at the at least one device, wherein at least one prompt requests user permission to initiate the at least one offline time, the at least one online time, or a combination thereof according to the at least one polling interval, the at least one activity time, or a combination thereof. In one embodiment, a PNS may send a request to a PNC and cause a presentation of a prompt at the PNC requesting user consent to initiating an offline or online time for communications between the PNS and the PNC. For example, a PNS may determine that a notification, update, message, or the like is to be communicated to the PNC before a next regularly scheduled indication session, wherein the PNS would inquire with the user of the PNC if a more immediate communication session may be established between the PNS and the PNC.

As shown in FIG. 1, in one embodiment, the system 100 includes user equipment 101a-101n (also collectively referred to as UE 101 and/or UEs 101), which may be utilized to execute one or more applications 103a-103n (also collectively referred to as applications 103) including social networking, web browser, content sharing, multimedia applications, augmented reality (AR), virtual reality (VR), UI, map application, web client, etc.

Additionally, the applications 103 may facilitate communication with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), a notification platform 121, a notification database 123, and/or with other components of the system 100 directly and/or via communication network 111. In one embodiment, the UEs 101 may include notification applications 113a-113n (also collectively referred to as notification application 113), and data/content collection modules 115a-115n (also collectively referred to as DC module 115).

In one embodiment, the application 103 may be in connectivity with the notification application 113 such that the notification application 113 may relate to the notification platform 121 that an application 103 has been installed or is in use at a UE 101. In one embodiment, the notification application 113 may even participate in the installation of application 103, where applications that are installed with the aid of notification application 113 are in contact with notification platform 121. In one embodiment, a user interface application 103 may aid in displaying notifications and/or initial subscription messages where the notification platform 121 may prompt the user to establish settings associated with notification or update subscriptions or displays. In another example, the notification application 113 may track any changes to the configurations at the UE 101 and notify the notification platform 121. In one embodiment, the notification application 113 may subscribe applications 103 (and UE 101) to the notification platform 121, where the notification platform 121 may then schedule and communicate the schedule intervals/settings/parameters to the UE 101.

In one embodiment, the DC module 115 may be used for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the service providers 105 may include and/or have access to one or more service databases 117a-117n (also collectively referred to as service database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof.

In one embodiment, the content providers 107 may include and/or have access to one or more content database 119a-119n (also collectively referred to as content database 119), which may store, include, and/or have access to various content items. For example, the content providers 107 may store content items (e.g., at the content database 119) provided by various users, various service providers, crowd-sourced content, and the like. Further, the service providers 105 and/or the content providers 107 may utilize one or more service application programming interfaces (APIs)/integrated interface, through which communication, notifications, updates, content, and information (e.g., associated with users, applications, services, content, etc.) may be shared, accessed and/or processed.

In various embodiments, the service providers 105 and/or the content providers 107 may include and/or have access to information associated with notifications and updates associated with one or more applications, software, contents, and the like.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, the notification platform 121, and the notification database 123 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, the content providers 107, and the notification platform 121 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
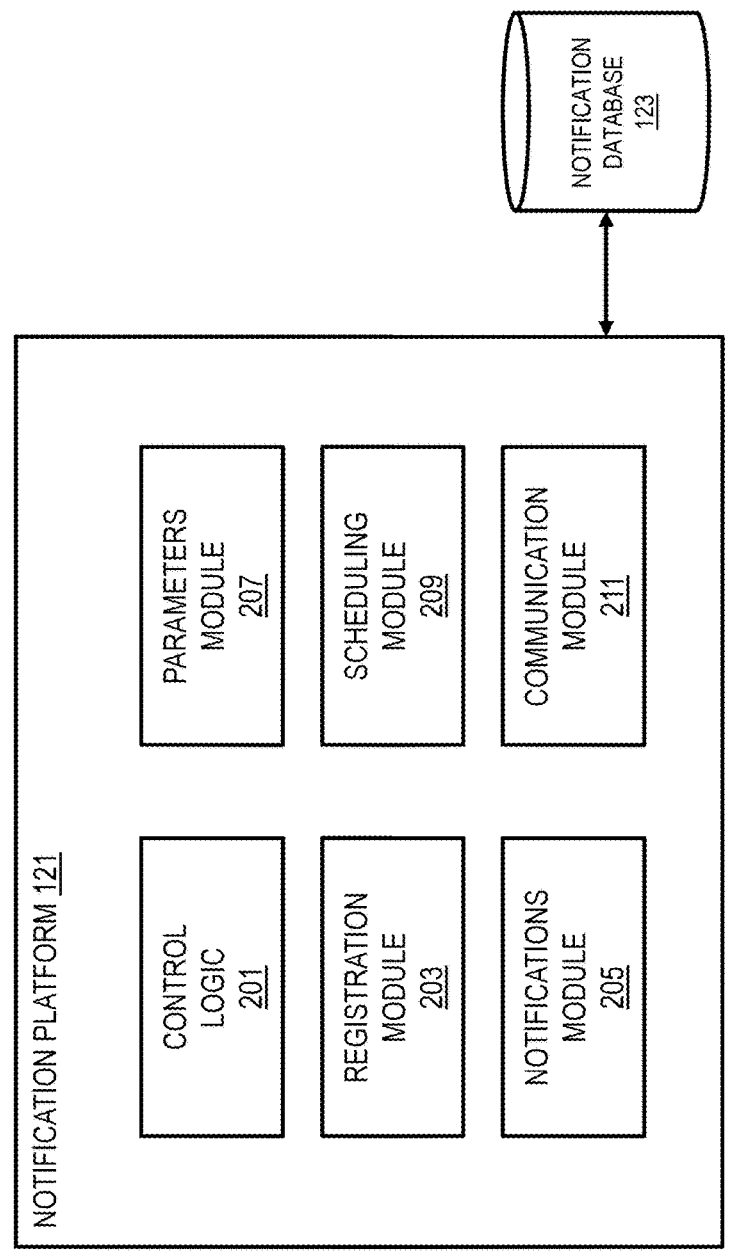
FIG. 2 is a diagram of the components of a notification platform, according to an embodiment.

FIG. 2 is a diagram of the components of a notification platform, according to an embodiment. By way of example, the notification platform 121 includes one or more components for managing polling interval and activity time for providing notifications from one or more PNSs to one or more PNCs. It is contemplated that the functions of these components may be combined in one or more components or performed by other components of equivalent functionality. In this embodiment, the notification platform 121 includes a control logic 201, a registration module 203, a notifications module 205, a parameters module 207, a scheduling module 209, and a communication module 211. The control logic 201 may execute at least one algorithm for executing functions at the notification platform 121.

In one embodiment, the control logic 201 and registration module 203 may cause a registration of one or more application identifiers associated with one or more applications, at least one device identifier associated with at least one UE 101 so that one or more relevant notifications or updates may be communicated to the UE 101. In one embodiment, the application and device identifiers may be received from the UE 101 as part of a subscription/registration process initiated by the UE 101. In one embodiment, the registration module 203 may determine the use of one or more applications at a UE 101 and then cause the registration of the application and device identifiers at the notification platform 121. For example, the use of or installation of an application at a UE 101 may trigger the registration process at the notification platform 121, which may be due to default configuration settings at the UE 101 and/or the applications. In various embodiments, application identifiers may be unique to each application installed on a UE 101 or they may be associated with a plurality of UEs 101, which have the applications installed.

In one embodiment, the notifications module 205 may interface with one or more parties (e.g., application/content/software owners, developers, publishers, etc.) that may provide one or more notifications or updates associated with one or more applications, software, contents, which are to be distributed to one or more UEs 101. In one scenario, the notifications may be stored in the notification database 123, wherein the one or more parties may directly deposit their respective notifications or updates in the notification database 123. In one scenario, the notification platform 121 may inquire with the one or more parties regarding the notifications or updates. In various embodiments, the notification platform 121 may be dedicated to distribute the notifications or updates for one or more parties. In one embodiment, the notification platform 121 may be implemented as part of a service/content provider.

In one embodiment, the parameters module 207 may determine various parameters associated with one or more UEs 101, which may be interfacing with the notification platform 121 for receiving the notifications or updates. In various scenarios, the parameters may be directly received from various UEs 101 or that the notification platform 121 may inquire and determine the parameters from the various UEs 101. In one embodiment, the parameters module 207 may determine the parameters from various information items associated with a UE 101. For example, location information of a UE 101 may indicate certain parameters that are to be used in providing and communicating one or more notifications or updates. In another example, type of communication channel available to a UE 101 may be utilized to determine the parameters for communicating with and providing the notifications or updates to the UE 101.

In one embodiment, the scheduling module 209 may utilize parameters from the parameters module 207 for determining a schedule for communicating with one or more UEs 101. In one embodiment, the scheduling module 209 may provide the parameters to the UEs 101 so that they can determine the communication intervals when communicating with the notification platform 121. In one embodiment, a communication schedule with a UE 101 may include a start time, stop time, on-line time, off-line time, activity time, or the like associated with a communication session. For example, an on-line time would indicate to a UE 101 as to when a next communication session with the notification platform 121 would be.

In one embodiment, the communication module 211 can be used to communicate with one or more entities of the system 100. Certain communications can be via methods such as an internet protocol, messaging (e.g., SMS, MMS, etc.), or any other communication method (e.g., via the communication network 111).

Figure 3:
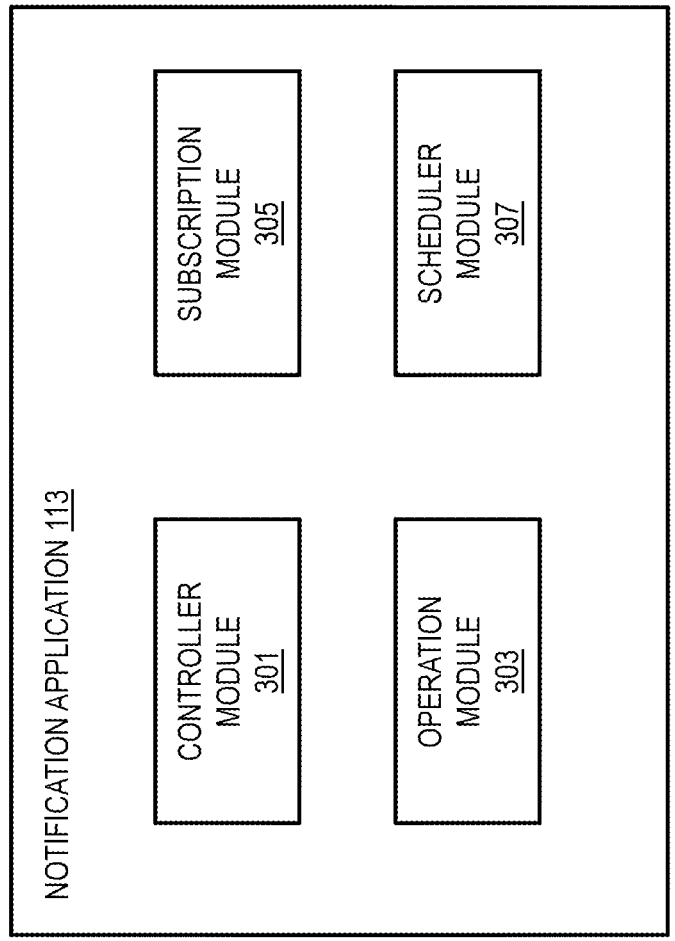
FIG. 3 is a diagram of the components of a notification application, according to an embodiment.

FIG. 3 is a diagram of the components of a notification application, according to an embodiment. By way of example, the notification application 113 includes one or more components for subscribing to notifications services for effectuating updates to applications, software, content, or the like that may be used at a UE 101 device. It is contemplated that the functions of these components may be combined in one or more components or performed by other components of equivalent functionality. In this embodiment, the notification application 113 includes a controller module 301, an operation module 303, a subscription module 305, and a scheduler module 307.

In one embodiment, the controller module 301 and operation module 303 may monitor various activities at the UE 101, for example, activities related to the use of various applications or resources at the device. In one embodiment, the operation module 303 may determine at least one operation associated with one or more applications or content items that may trigger a subscription to at least one notification service for requesting one or more updates for the applications or the contents. For example, the operation may include determining that an applications is due for one or more updates, which may be based on information associated with the application at the UE 101. Additionally, the operation module 303 may determine what resources at the UE 101 are in use, for example, the user is utilizing one or more applications or software in a voice call, in consuming a content item (e.g., listening to an audio file), in accessing the Internet, playing a video game, or the like. In one embodiment, one or more information items (e.g., dates) associated with an application at the UE 101 may indicate that there may be one or more updates available from one or more sources (e.g., publishers, owners, vendors, etc.)

In one embodiment, the subscription module 305 may cause a subscription to at least one notification and update service provider (PNS) for registering the UE 101 and/or one or more applications, software, contents, etc. at the UE 101. For example, the controller module 301 and the subscription module 305 may determine and register with one or more service providers for notifications associated with the one or more applications, software, contents, etc. In one scenario, each application may be associated with a certain service provider, and in one scenario, one service provider may provide updates and notifications for a variety of applications, software, content, etc. For instance, a service provider may interface with various application, software, content, etc. developer/vendor that may provide the notifications or updates, which the service provider may deliver to the UEs 101.

In one embodiment, the controller module 301 and the scheduler module 307 may interact with one or more service providers for receiving parameters or information on scheduling communication intervals associated with possible notifications and updates available to a UE 101. For example, the scheduler module 307 may receive time interval information for communicating with a service provider on one or more notifications or updates that may be available from that service provider. In one embodiment, a service provider may transmit one or more parameters to a UE 101, which the scheduler module 307 may utilize to determine one or more intervals for communicating with that service provider. In one embodiment, the scheduler module 307 may utilize a user interface at the UE 101 to interact with the user of the UE 101 and present one or more information items associated with the communication intervals with the service provider. In one embodiment, a user may be presented with one or more options for allowing a communication with a service provider associated with a notification or an update, for example, in response to an urgent notification from a service provider or for an unscheduled communication interval due to a missed scheduled communication interval.

Figure 4:
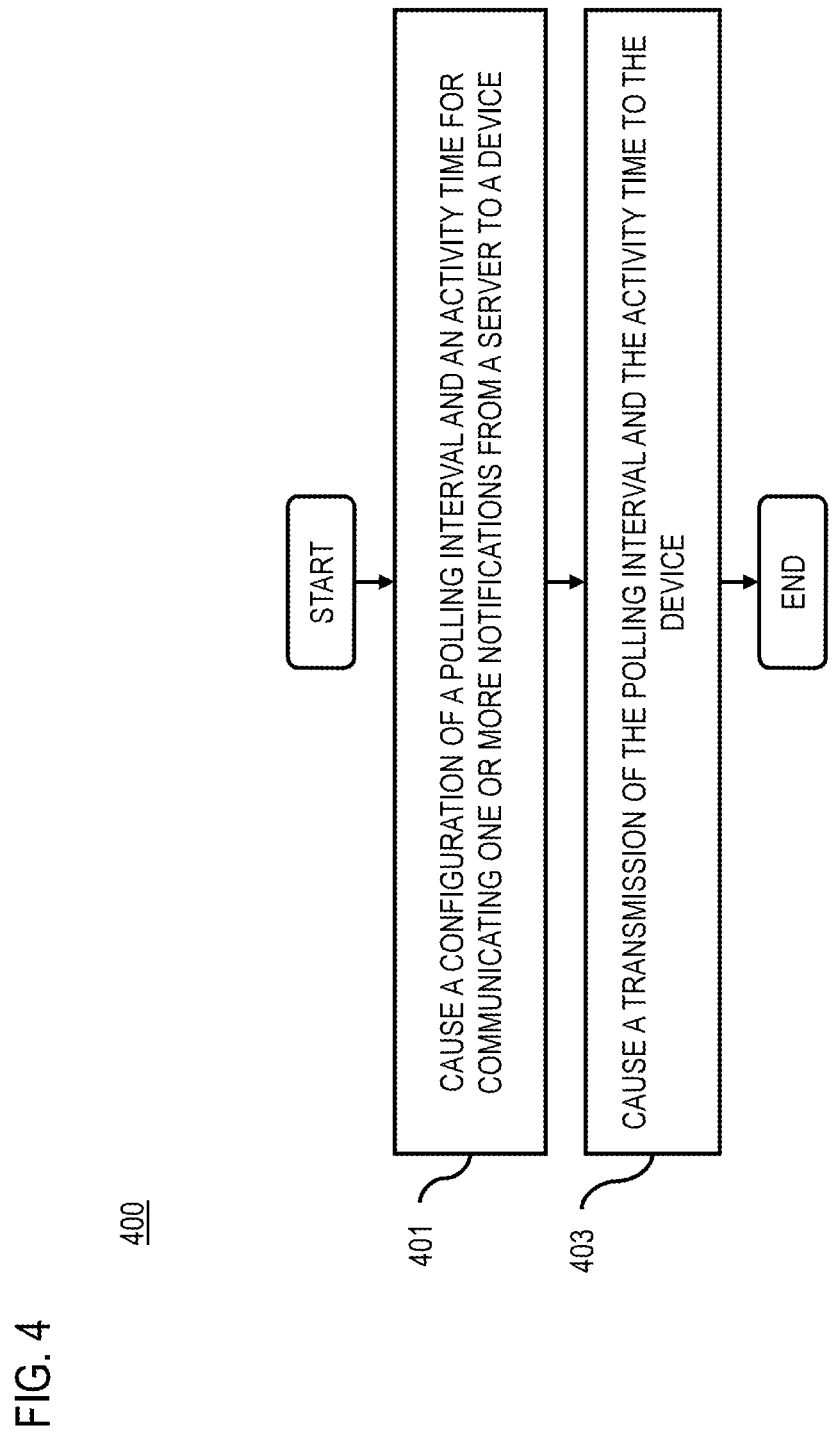
FIGS. 4 through 6 are flowcharts of various processes for, at least, managing polling interval and activity time for communicating notifications from a server to a device, according to various embodiments.
Figure 5:
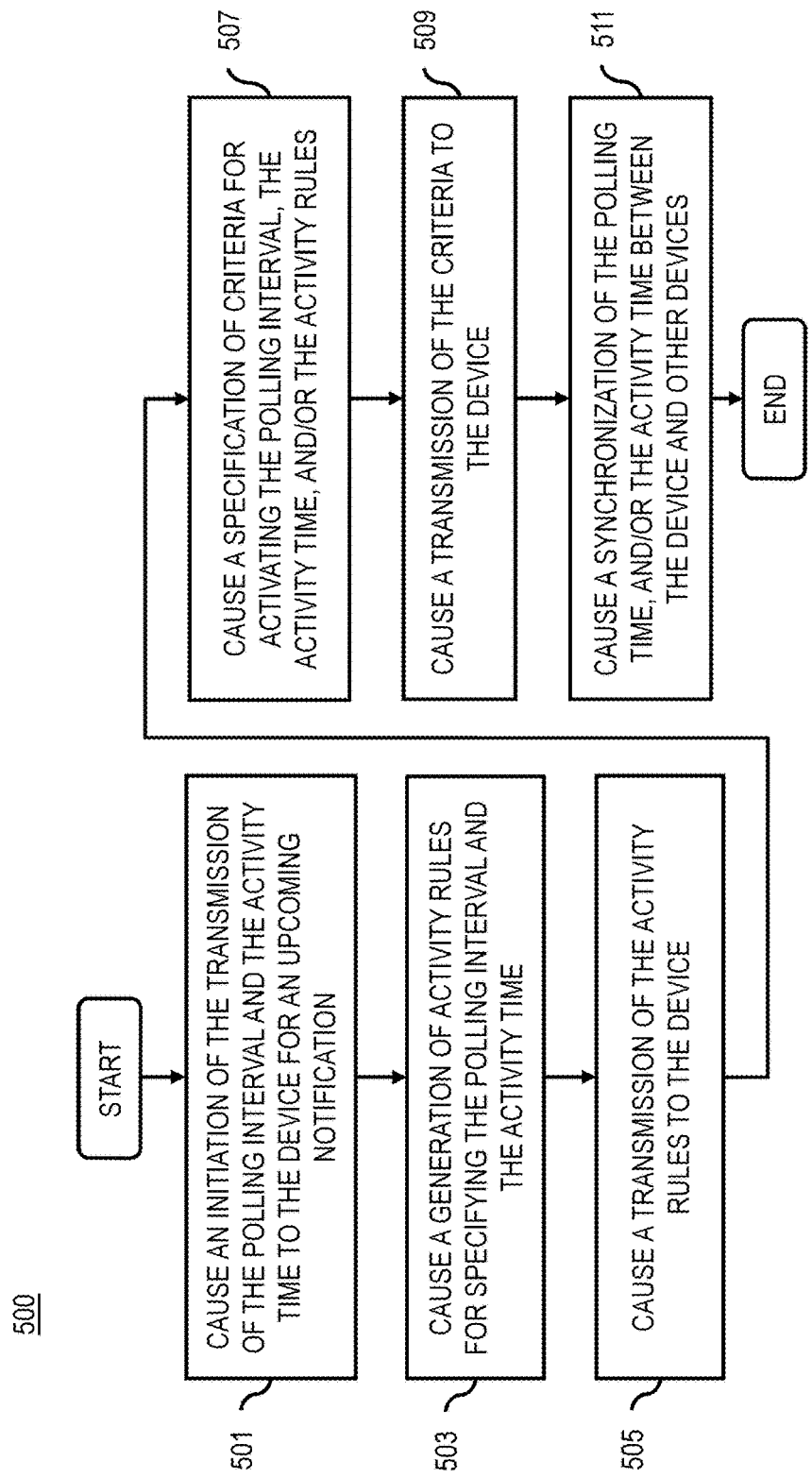
Figure 6:
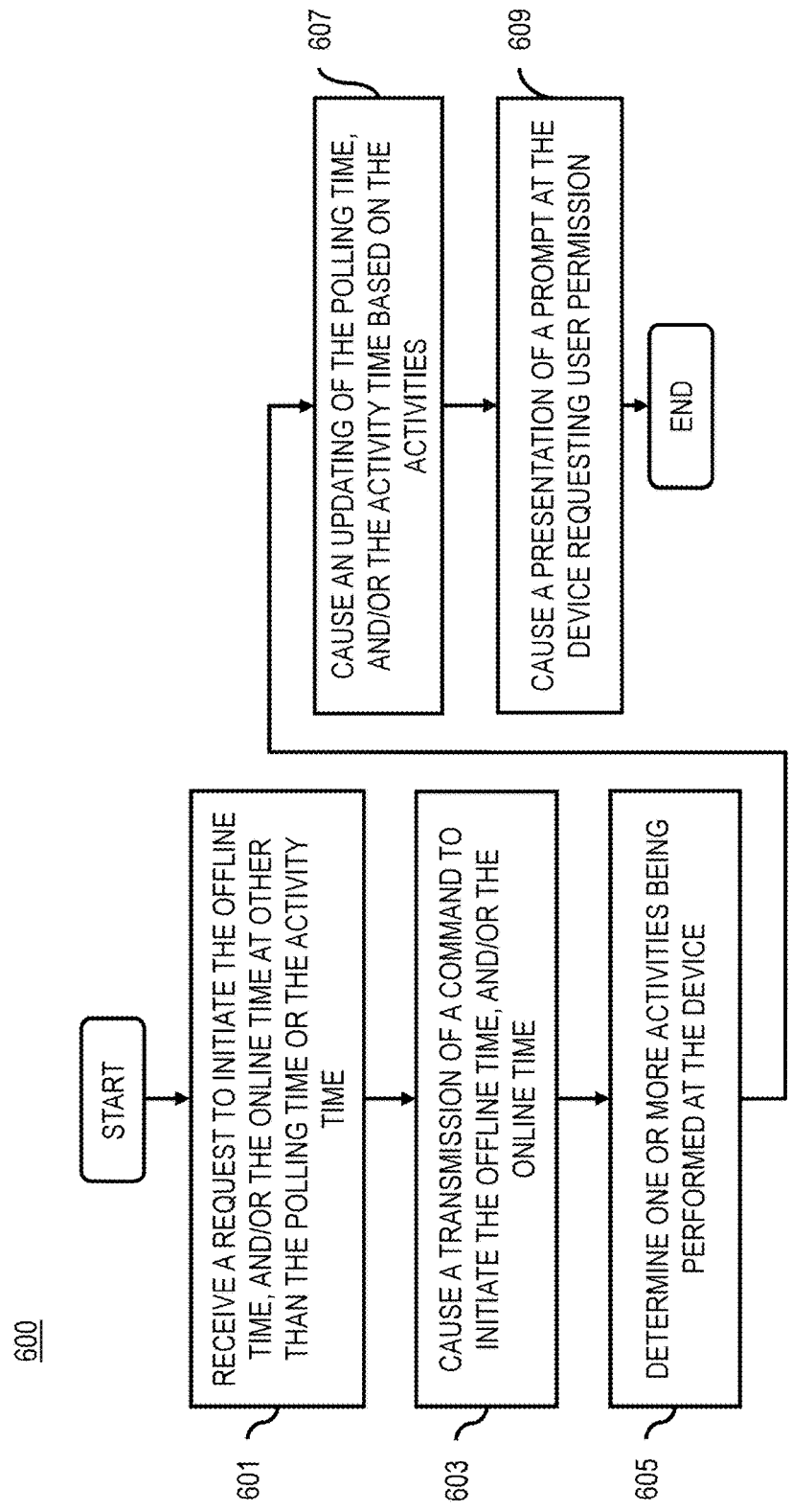
Figure 10:
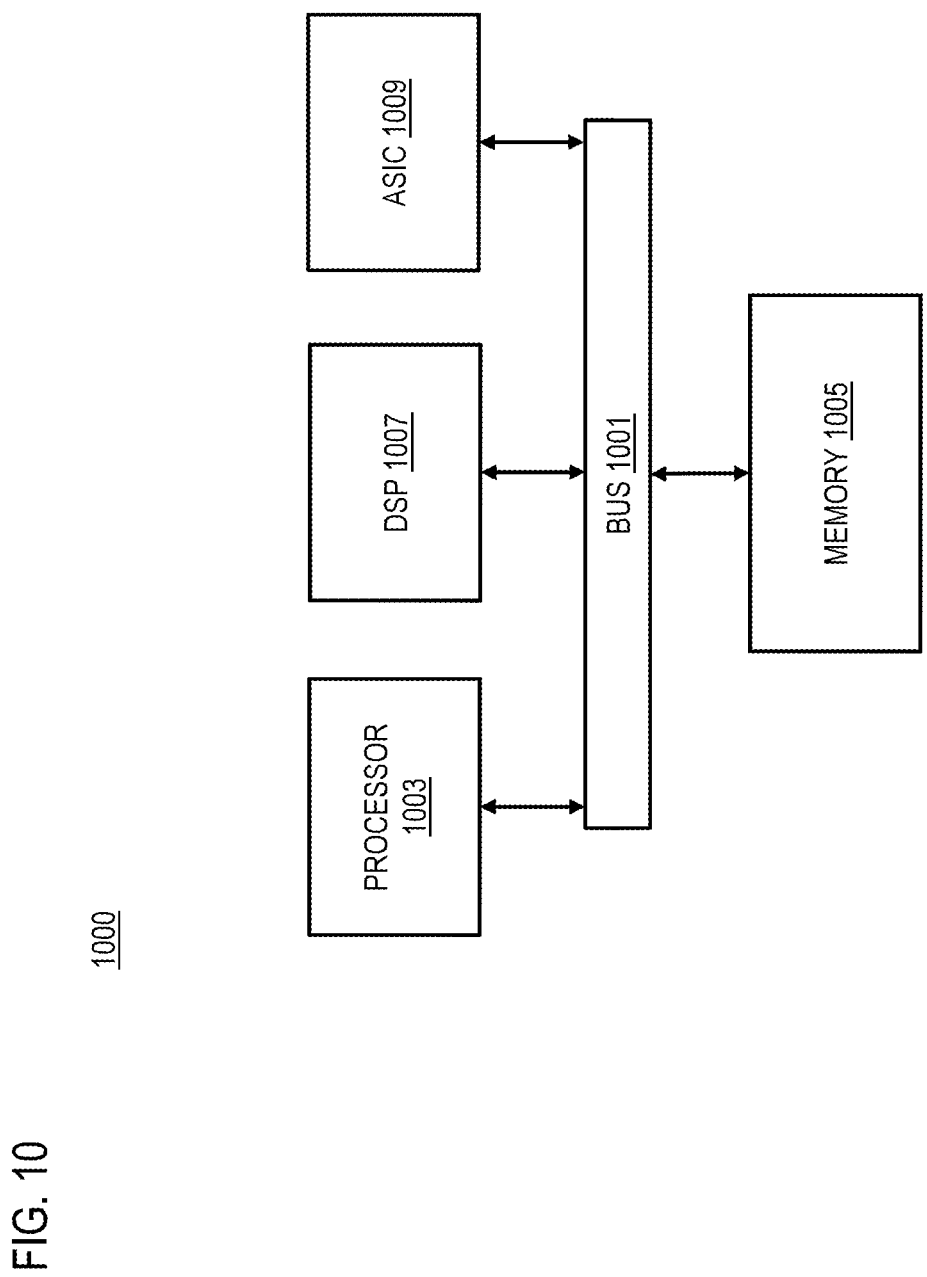
FIG. 10 is a diagram of a chip set that can be used to implement an embodiment of the invention.

FIGS. 4 through 6 are flowcharts of various processes for, at least, managing polling interval and activity time for communicating notifications from a server to a device, according to various embodiments. In various embodiments, a notification platform 121 (PNS) and/or a notification application 113 at a UE 101 (PNC) may perform one or more portions of the processes 400, 500, and 600, which may be implemented in, for instance, a chip set including a processor and a memory as shown in FIG. 10. As such, the notification platform 121 and/or the notification application 113 can provide means for accomplishing various parts of the process 400, 500, and 600 as well as means for accomplishing other processes in conjunction with other components of the system 100. Throughout these processes, the a notification platform 121 and/or a notification application 113 may be referred to as completing various portions of the processes 400, 500, and 600, however, it is understood that other components of the system 100 can perform some of and/or all of the process steps. Further, for clarity in discussing the 400, 500, and 600 processes, the notification platform 121 is referred to as completing various steps of said processes; however, said processes and/or example steps described therein may be performed in any suitable order and/or may be optional.

The process 400 may begin at step 401 of the FIG. 4, where the notification platform 121 may cause, at least in part, a configuration of at least one polling interval and at least one activity time for communicating one or more notifications from at least one notification server to at least one device. In one embodiment, the activity time specifies at least one online time for the at least one device with respect to the at least one notification server. For example, the online time may indicate for PNC (e.g., a UE 101) to be online and ready to communicate with a PNS (e.g., a service provider) for receiving one or more notifications, updates, messages, polling interval, activity time, or the like. In one embodiment, the polling interval specifies at least one offline time for the at least one device (PNC) with respect to the at least one notification server (PNS). In one embodiment, a PNS may determine a polling interval and/or an activity time based on one or more information items associated with the user, the PNC, or a combination thereof. For example, a user profile information at a PNC may indicate that the user wishes to only receive notifications or updates during a certain time of day (e.g., during the morning.) In one example, a device configuration at a PNC may indicate that the activity time for communicating with the PNS should be when the device is in an idle mode, the batteries fully charged, the device is connected to a power source, or the like. In various embodiments, the least one polling interval, the at least one activity time, or a combination thereof are specified according to at least one absolute time, at least one relative time, or a combination thereof. In one embodiment, a PNS may utilize configuration or user profile information at a PNC to determine a relative or an absolute time for the polling interval and/or the activity time.

In step 403, the notification platform 121 may cause, at least in part, a transmission of the at least one polling interval and the at least one activity time to the at least one device. In one embodiment, a PNS may transmit a similar or same polling interval or activity time to one or more PNCs, which may have a similar or same user profile or device configuration information. For example, a plurality of PNCs may be configured with a polling interval for when the PNCs at a certain location (e.g., at work, at home, at school, etc.) during the day.

The process 500 may begin at step 501 of the FIG. 5, where the notification platform 121 may cause, at least in part, an initiation of the transmission of the at least one polling interval and the at least one activity time to the at least one device for an upcoming notification period when the at least one device communicates with the at least one notification server during a current communication period. In one scenario, a communication between a PNC and a PNS may include information about a next polling interval and activity time, wherein the activity time may include transmission of one or more notifications or updates to the PNC. In one scenario, a communication period may include only a next polling interval and no notifications of updates for that PNC.

In step 503, the notification platform 121 may cause, at least in part, a generation of one or more activity rules for specifying the at least one polling interval and the at least one activity time. In one embodiment, a PNS may utilize various user or device information (criteria) of a PNC for determining and generating one or more activity rules or parameters, which may be used to generate or calculate a polling interval or an activity time. In various embodiments, the activity rules may be generated dynamically based on the user, PNC, or PNS information at a given time. For example, user profile may indicate that one or more applications at a PNC should be updated more frequently than other applications at the PNC. In one example, the PNS information may indicate traffic volume at the PNS (e.g., how busy) may be.

In step 505, the notification platform 121 may cause, at least in part, a transmission of the one or more activity rules to the at least one device. In one embodiment, the one or more activity rules may be communicated to a PNC so that it can utilize the activity rules for determining a polling interval or an activity time. In one embodiment, the activity rules may be utilized by either a PNS or a PNC for determining the polling interval or the activity time. In one scenario, the same one or more activity rules may be transmitted to a plurality of PNCs.

In step 507, the notification platform 121 may cause, at least in part, a specification of one or more criteria for activating the at least one polling interval, the at least one activity time, the one or more activity rules, or a combination thereof. In one embodiment, the one or more criteria include, at least in part, data type criteria, location criteria, network type criteria (e.g., Wi-Fi, cellular, free of charge, etc.), application type criteria, activity criteria (walking, running, driving, etc.), device capability criteria, device resource availability criteria (e.g., battery life, radio signal level), device sensor information criteria (e.g., weather, barometer, etc.), recurrence criteria (e.g., calendar information), or a combination thereof. In various scenarios, the PNS may include a validity duration, exact time or date, location of the PNC, or the like so that the one or more activity rules may be utilized by a PNC. In one example, if two PNCs (e.g., two users) of same group are in close proximity/same location. In one scenario, based on an activity determined from one or more sensors on the PNC device, for example, many users may be at a sports stadium and the PNS server can utilize the polling interval and the activity-time based on received information about the location and activity. In scenario, capability information of a PNC may be shared with the PNS, wherein the PNS and/or the PNC may further adjust the polling interval and activity time. For example, the PNS may decrease or increase the polling interval and/or decrease the activity time based on communication network's traffic load.

In step 509, the notification platform 121 may cause, at least in part, a transmission of the one or more criteria to the at least one device. In one scenario, a PNS may determine the one or more criteria and then communicate them to one or more PNCs.

In step 511, the notification platform 121 may cause, at least in part, a synchronization of the at least one polling interval, the at least one activity time, or a combination thereof between the at least one device and one or more other devices receiving the one or more notifications. In one use case scenario, a PNS may provide one or more notifications and updates to a plurality of PNCs at the same time by synchronizing polling intervals and activity times of the plurality of PNCs. For example, many UEs 101 may be utilizing the same application which may need to be updated, wherein the service provider may be able to synchronize the updates to the UEs 101 by synchronizing the polling intervals and the activity times of those UEs 101.

The process 600 may begin at step 601 of the FIG. 6, where the notification platform 121 may receive at least one request to initiate the at least one offline time, the at least one online time, or a combination thereof at one or more times other than indicated by the at least one polling interval, the at least one activity time, or a combination thereof. In one embodiment, a PNS may receive a request from a PNC to initiate an offline time or an online time, which may be different than those indicated in the polling interval and/or the activity time. For example, the request may come from a UE 101 that may be requesting for an update or a notification associated with one or more applications, software, content items, or the like at the UE 101. In one scenario, the request from a PNC may be due to unexpected changes at the PNC, for example, the PNC may be anticipating being a different location (e.g., according to a calendar entry) during an already scheduled activity time so the user of the PNC or an application at the PNC may initiate the request.

In step 603, the notification platform 121 may cause, at least in part, a transmission of at least one command to initiate the at least one offline time, the at least one online time, or a combination thereof to the at least one device in response to the at least one request. In one scenario, a PNS may transmit to a PNC one or more criteria, commands, or times for generating or initiating the requested offline or online times. In one scenario, the PNS may determine and transmit the offline and online times to the PNC.

In step 605, the notification platform 121 may determine one or more activities being performed at the at least one device. In one scenario, a PNS may inquire information from one or more applications at a PNC for determining if there are any current activities at the PNC. For example, to determine if the user or any application/module at the PNC are actively utilizing any resources at the PNC, e.g., is the user consuming a media content item, or is accessing the Internet, or is reading email messages, or an application is performing a backup of the PNC content to a network location. In one embodiment, the PNS may inquire about to one or more activities in the near future. For example, an application at the PNC may indicate that the user has requested for downloading of a media content item, which will begin in five minutes.

In step 607, the notification platform 121 may cause, at least in part, an updating of the at least one polling interval, the at least one activity time, or a combination thereof based, at least in part, on the one or more activities. In one embodiment, a PNS may utilize information related to one or more activities at the PNC and determine an update of the polling interval or the activity time associated with the PNC. For example, the PNS may determine that the user is utilizing application which is to be updated and then the PNS may update a polling interval and activity time for when the user has completed utilizing the application. In one embodiment, the PNS may request for the PNC to send an update on the activity at the PNC.

In step 609, the notification platform 121 may cause, at least in part, a presentation of at least one prompt at the at least one device, wherein at least one prompt requests user permission to initiate the at least one offline time, the at least one online time, or a combination thereof according to the at least one polling interval, the at least one activity time, or a combination thereof. In one embodiment, a PNS may send a request to a PNC and cause a presentation of a prompt at the PNC requesting user consent to initiating an offline or online time for communications between the PNS and the PNC. For example, a PNS may determine that a notification, update, message, or the like is to be communicated to the PNC before a next regularly scheduled indication session, wherein the PNS would inquire with the user of the PNC if a more immediate communication session may be established between the PNS and the PNC.

Figure 7:
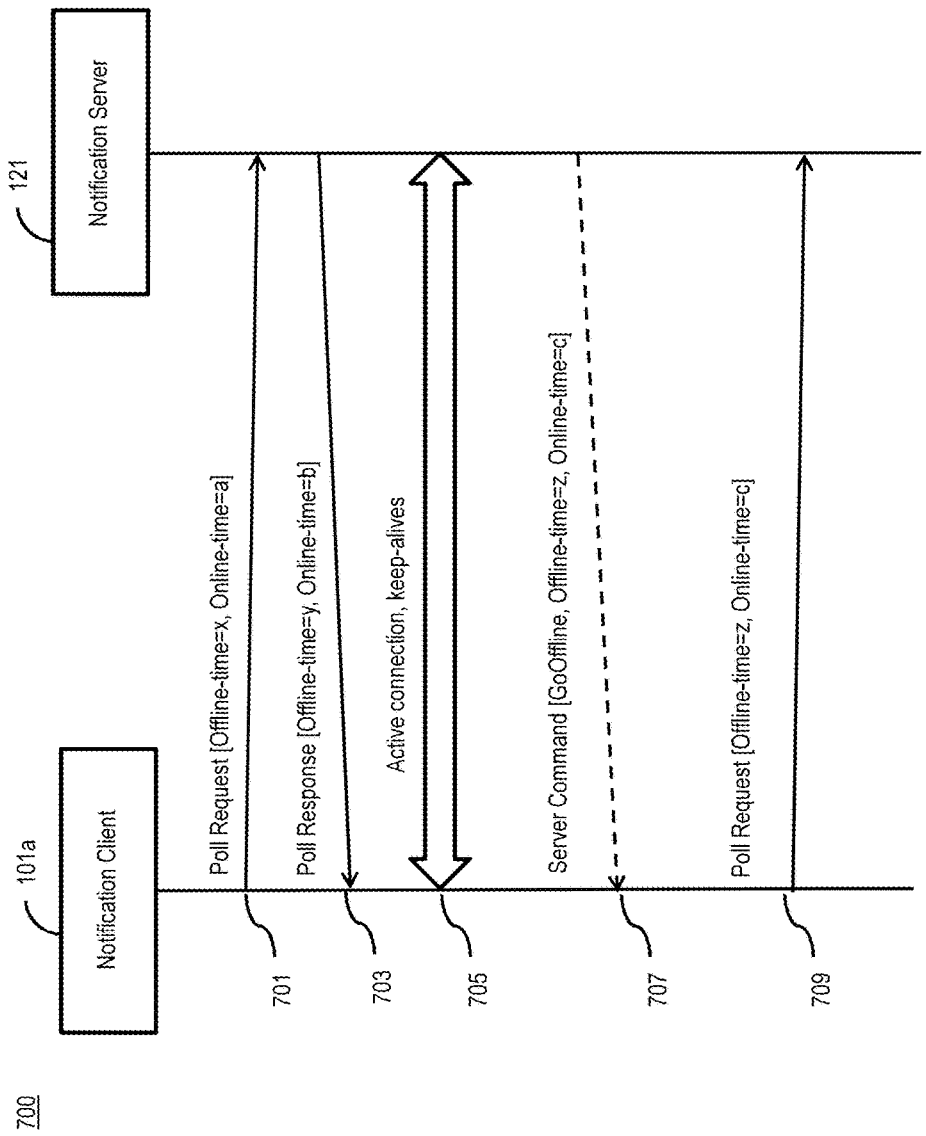
FIG. 7 is an illustration of a timing diagram for at least one of the processes in FIGS. 4 through 6, according to an embodiment.

FIG. 7 is an illustration of a timing diagram for at least one of the processes in FIGS. 4 through 6, according to an embodiment.

Process 700 of FIG. 7 may begin at 701 where the PNS 121 may receive a polling request 701 from a PNC, UE 101*a*, where the request may include polling interval of an offline-time ="X" and an online-time="A". In one embodiment, the offline (X) and online (A) times in 701 may be from (e.g., initial) configuration settings at the UE 101*a*. In one embodiment, the PNS 121 may respond by communicating a polling response 703 including polling interval of an offline-time="Y" and an online-time="B". In one embodiment, the PNS 121 may communicate the offline-time and online-time parameters in 703 without receiving the polling request 701; for example, during an initial configuration of the PNC polling interval and activity time parameters. In various embodiments, the offline and online times maybe decreased, increased, or remain the same when compared to previous settings. In one scenario, the off-line or online times may be absolute or relative to a known time parameter. Further at 705, an activity time communication session and relevant signals (e.g., keep alive signals) may be exchanged between the PNS 121 and the PNC. In one scenario, the PNS 121 may provide one or more notifications for updates to the PNC. In one embodiment, at 707, the PNS 121 may communicate one or more commands to the PNC. For example, instead of an active communication session 705, the PNS 121 may communicate a server command for instructing the PNC to go off-line at time="Z" and an online time="C". In one scenario, after offline time ="Z", at 709 the PNS 121 may receive a polling request the PNC indicating the last parameters of offline time="Z" and online time="C". As noted earlier, the PNS 121 may communicate one or more criteria to the PNC so that it can determine a polling interval and active time based on the criteria.

Figure 8:
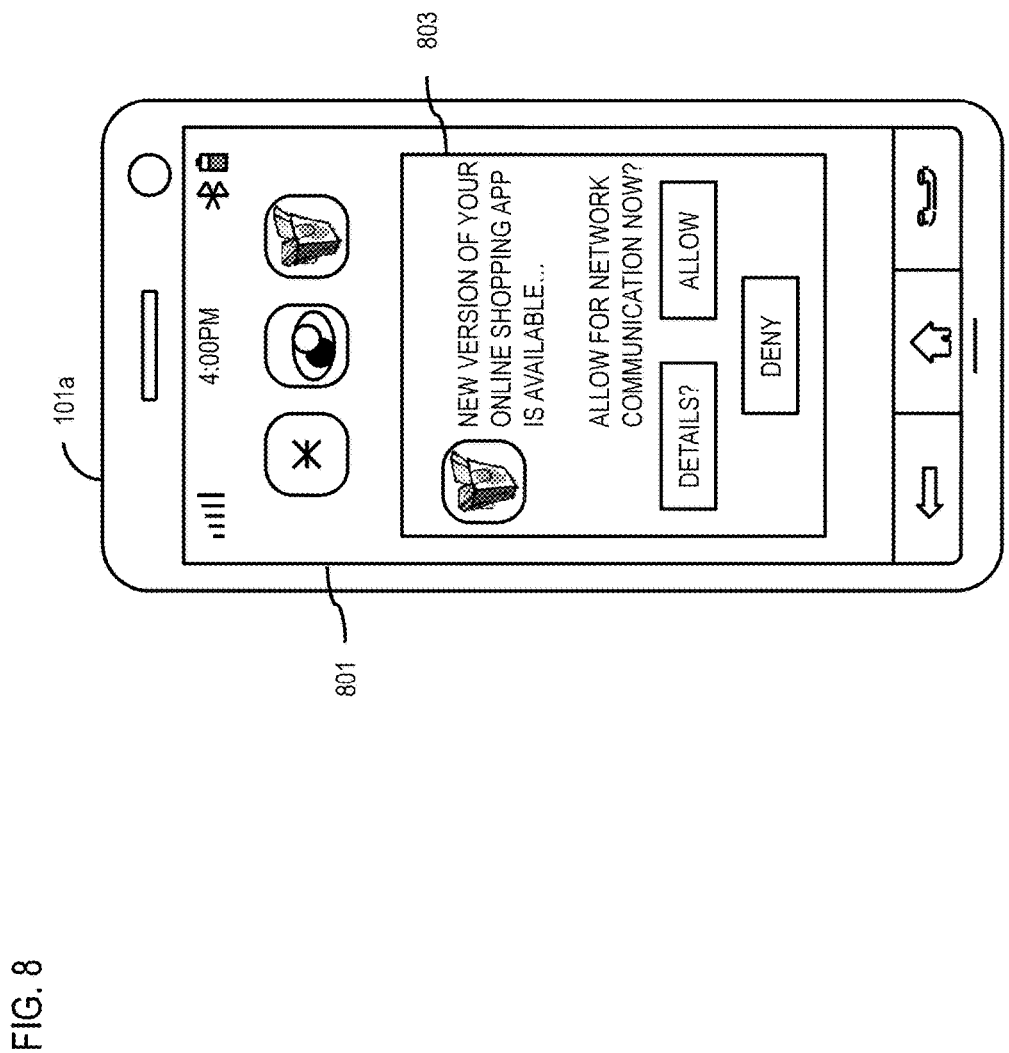
FIG. 8 is an illustration of a user interface utilized in at least one of the processes in FIGS. 4 through 6, according to an embodiment.

FIG. 8 is an illustration of a user interface utilized in at least one of the processes in FIGS. 4 through 6, according to an embodiment.

User interface 801 at a PNC UE 101*a* illustrates a prompt 803, which may be presented by a PNS 121 and include various information items associated with a request for establishing a communication session between the PNS 121 and the PNC. In one scenario, the prompt 803 may include information about one or more notifications or updates that may be available to the PNC; for example, an update associated with an application at the PNC. Further, the prompt 803 may inquire whether the user of the PNC would allow or deny the request for the network communication session. Additionally, the user may be presented with one or more options to interact with the prompt 803, e.g., received details about the available modification or update presented in the prompt 803.

The processes described herein for managing polling interval and activity time for communicating notifications from a server to a device may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
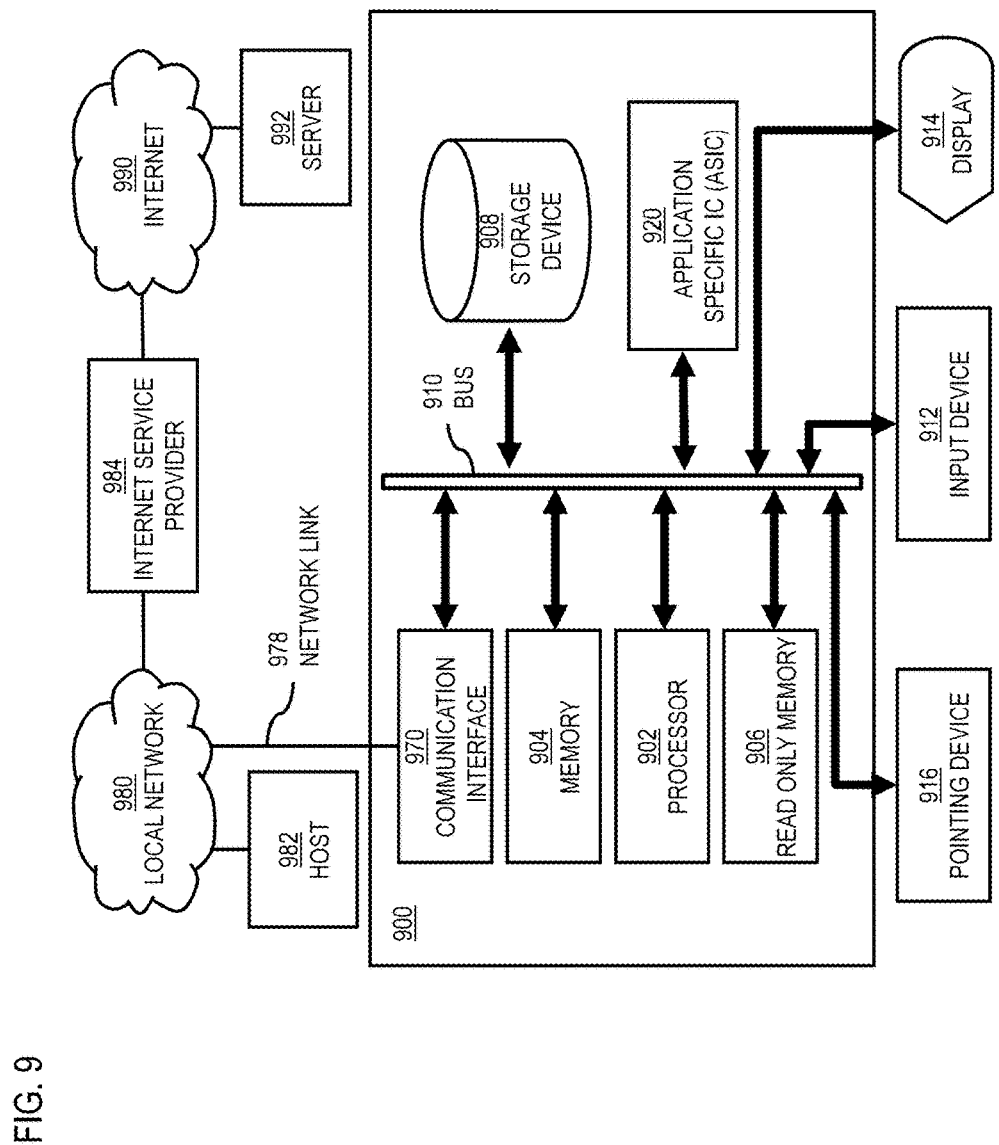
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to manage polling interval and activity time for communicating notifications from a server to a device as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of managing polling interval and activity time for communicating notifications from a server to a device.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to managing polling interval and activity time for communicating notifications from a server to a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for managing polling interval and activity time for communicating notifications from a server to a device. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for managing polling interval and activity time for communicating notifications from a server to a device, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914, and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 111 for managing polling interval and activity time for communicating notifications from a server to a device.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980, and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed for managing polling interval and activity time for communicating notifications from a server to a device as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of managing polling interval and activity time for communicating notifications from a server to a device.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to manage polling interval and activity time for communicating notifications from a server to a device. The memory 1005 also stores the data associated with or generated by the execution of the inventive steps.

Figure 11:
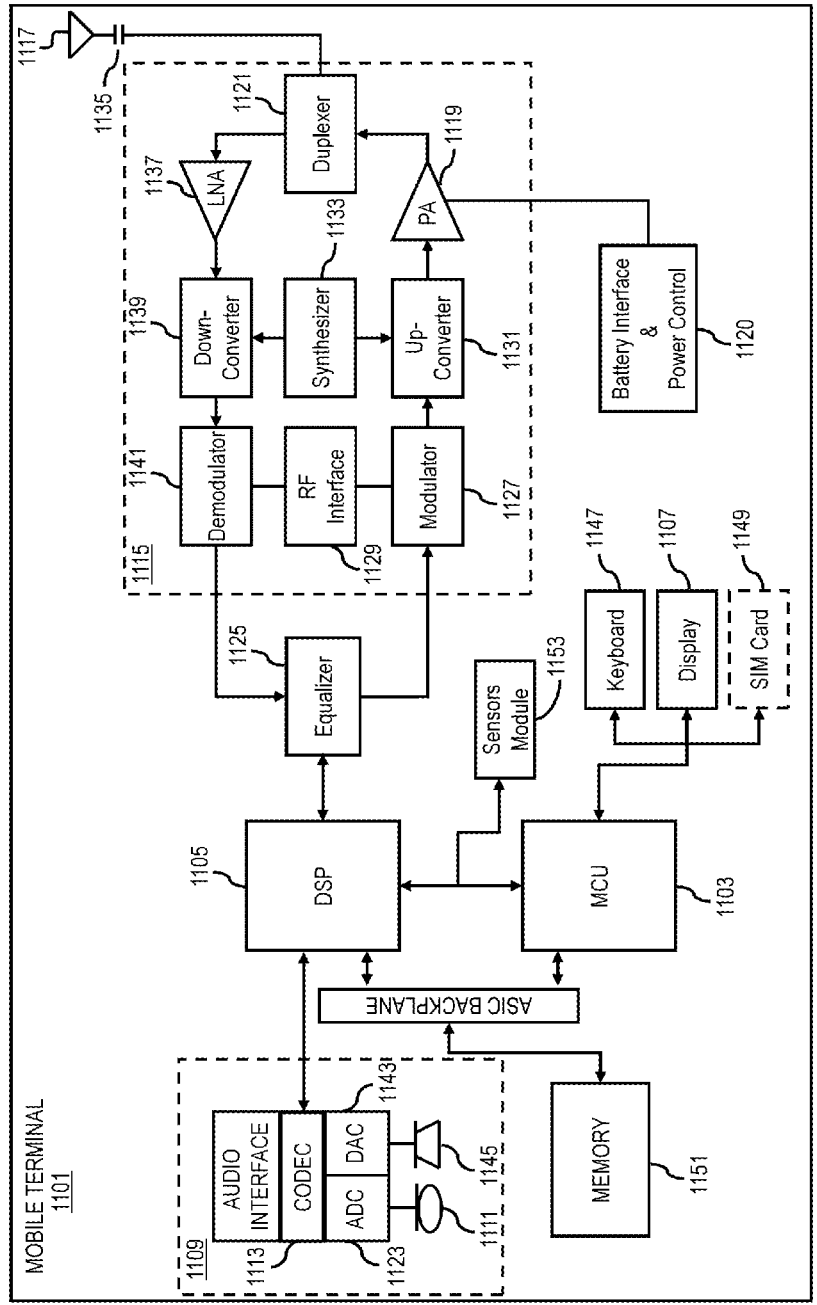
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of managing polling interval and activity time for communicating notifications from a server to a device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of managing polling interval and activity time for communicating notifications from a server to a device. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for managing polling interval and activity time for communicating notifications from a server to a device. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network.

The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   configuring at least one polling interval and at least one activity time for communicating notifications from at least one notification server to at least one device, wherein one or more of the at least one device is a push notification client and one or more of the at least one notification server is a push notification server,
   wherein the notifications are characterized as notifications, messages, updates or some combination thereof associated with applications, two or more software, content items or some combination thereof at the at least one device;
   transmitting the at least one polling interval and the at least one activity time to the at least one device;
   synchronizing the at least one polling interval, the at least one activity time, or a combination thereof between the at least one device and a plurality of other devices receiving the notifications at the same time;
   initiating at least one offline time, at least one online time, or a combination thereof at one or more times other than indicated by the at least one polling interval, the at least one activity time, or a combination thereof; and
   transmit from the at least one notification server at least one command to initiate the at least one offline time and the at least one online time to the at least one device in response to at least one request,
   wherein the polling interval specifies the at least one offline time for the at least one device to not communicate with the at least one notification server,
   wherein the activity time specifies at least one online time for the at least one device to communicate with the at least one notification server, and
   wherein the at least one polling interval, the at least one activity time, or a combination thereof are specified according to at least one absolute time, at least one relative time, or a combination thereof.

2. A method of claim 1, further comprising:
   initiating the transmission of the at least one polling interval and the at least one activity time to the at least one device for an upcoming notification period when the at least one device communicates with the at least one notification server during a current communication period.

3. A method of claim 1, further comprising:
   generating one or more activity rules for specifying the at least one polling interval and the at least one activity time; and
   transmitting the one or more activity rules to the at least one device.

4. A method of claim 3, further comprising:
   specifying one or more criteria for activating the at least one polling interval, the at least one activity time, the one or more activity rules, or a combination thereof; and
   transmitting the one or more criteria to the at least one device.

5. A method of claim 4, wherein the one or more criteria include, at least in part, data type criteria, location criteria, network type criteria, application type criteria, activity criteria, device capability criteria, device resource availability criteria, device sensor information criteria, recurrence criteria, or a combination thereof.

6. A method of claim 1, further comprising:
   determining one or more activities being performed at the at least one device; and
   updating the at least one polling interval, the at least one activity time, or a combination thereof based, at least in part, on the one or more activities.

7. A method of claim 1, further comprising:
   presenting at least one prompt at the at least one device, wherein at least one prompt requests user permission to initiate the at least one offline time, the at least one online time, or a combination thereof according to the at least one polling interval, the at least one activity time, or a combination thereof.

8. An apparatus comprising:
   at least one processor; and
   at least one memory including computer program code for one or more programs,
   the at least one memory and the computer program code configured to, with the at least one processor, cause the apparatus to perform at least the following:
   configure at least one polling interval and at least one activity time for communicating notifications from at least one notification server to at least one device, wherein one or more of the at least one device is a push notification client and one or more of the at least one notification server is a push notification server,
   wherein the notifications are characterized as notifications, messages, updates or some combination thereof associated with applications, two or more software, content items or some combination thereof at the at least one device, and
   transmit the at least one polling interval and the at least one activity time to the at least one device;
   synchronize the at least one polling interval, the at least one activity time, or a combination thereof between the at least one device and a plurality of other devices receiving the notifications at the same time;
   initiate at least one offline time, at least one online time, or a combination thereof at one or more times other than indicated by the at least one polling interval, the at least one activity time, or a combination thereof; and
   transmit from the at least one notification server at least one command to initiate the at least one offline time and the at least one online time to the at least one device in response to at least one request, wherein the polling interval specifies at least one offline time for the at least one device to not communicate with the at least one notification server, wherein the activity time specifies at the least one online time for the at least one device to communicate with the at least one notification server, and wherein the at least one polling interval, the at least one activity time, or a combination thereof are specified according to at least one absolute time, at least one relative time, or a combination thereof.

9. An apparatus of claim 8, wherein the apparatus is further caused to:

transmit the at least one polling interval and the at least one activity time to the at least one device for an upcoming notification period when the at least one device communicates with the at least one notification server during a current communication period.

10. An apparatus of claim 8, wherein the apparatus is further caused to:

generate one or more activity rules for specifying the at least one polling interval and the at least one activity time, and transmit the one or more activity rules to the at least one device.

11. An apparatus of claim 10, wherein the apparatus is further caused to:

specify one or more criteria for activating the at least one polling interval, the at least one activity time, the one or more activity rules, or a combination thereof; and transmit the one or more criteria to the at least one device.

12. An apparatus of claim 11, wherein the one or more criteria include, at least in part, data type criteria, location criteria, network type criteria, application type criteria, activity criteria, device capability criteria, device resource availability criteria, device sensor information criteria, recurrence criteria, or a combination thereof.

13. An apparatus of claim 8, wherein the apparatus is further caused to:

determine one or more activities being performed at the at least one device, and update the at least one polling interval, the at least one activity time, or a combination thereof based, at least in part, on the one or more activities.

14. An apparatus of claim 8, wherein the apparatus is further caused to:

present at least one prompt at the at least one device, wherein at least one prompt requests user permission to initiate the at least one offline time, the at least one online time, or a combination thereof according to the at least one polling interval, the at least one activity time, or a combination thereof.

* * * * *